United States Patent [19]
Nilssen

[11] Patent Number: 4,554,487
[45] Date of Patent: Nov. 19, 1985

[54] ELECTRONIC FLUORESCENT LAMP BALLAST WITH OVERLOAD PROTECTION

[76] Inventor: Ole K. Nilssen, Caesar Dr., R.R.-5, Barrington, Ill. 60010

[21] Appl. No.: 495,540

[22] Filed: May 17, 1983

[51] Int. Cl.⁴ ............................................ H05B 41/24
[52] U.S. Cl. .................... 315/224; 315/225; 315/127; 363/55; 361/101
[58] Field of Search ............... 361/18, 101; 363/55, 363/25; 315/244, 224, 127, 225

[56] References Cited

U.S. PATENT DOCUMENTS

| 3,331,003 | 7/1967 | Johnston | 331/62 X |
| 4,370,600 | 1/1983 | Zansky | 315/244 |
| 4,398,126 | 8/1983 | Zuchtriegel | 315/127 |
| 4,406,976 | 9/1983 | Wisbey et al. | 315/244 X |

FOREIGN PATENT DOCUMENTS 729738  4/1980  U.S.S.R. .............................. 361/101

Primary Examiner—Leo H. Boudreau
Assistant Examiner—Vincent DeLuca

[57] ABSTRACT

Subject invention relates to an inverter-type electronic fluorescent lamp ballast wherein a series-resonant LC circuit connected across the inverter's output is used for matching the inverter's operating characteristics to those of the fluorescent lamp—the fluorescent lamp being connected in parallel with the tank-capacitor of this LC circuit.

More particularly, the invention relates to the use of a Varistor coupled in parallel with this tank-capacitor, thereby limiting the voltage developed thereacross to a magnitude suitable for proper lamp starting. Moreover, by providing for means whereby the inverter shuts itself off in case current flows through this Varistor for a longer time than it should take for a fluorescent lamp to start, inverter overload protection is obtained. Without such overload protection the inverter would self-destruct in case the fluorescent lamp failed to start or if it were removed from the circuit.

15 Claims, 1 Drawing Figure

ELECTRONIC FLUORESCENT LAMP BALLAST WITH OVERLOAD PROTECTION

BACKGROUND OF THE INVENTION

1. Field of Invention

The present invention relates to inverter-type electronic ballasts for fluorescent lamps, particularly of the type using series-resonant LC circuit means for matching the inverter's operating characteristics to those of the fluorescent lamp.

2. Description of Prior Art

Inverter-type fluorescent lamp ballasts in which a series-resonant LC circuit is used for matching the inverter's operating characteristics to those of the fluorescent lamp (i.e., series-resonance-loaded inverter ballasts) have been described in published literature, such as in U.S. Pat. No. 3,710,177 to Richard Ward or U.S. Pat. No. 4,370,600 to Zoltan Zansky.

In these ballasts, the fluorescent lamp is typically connected in parallel with the tank-capacitor of the series-resonant LC circuit, and the high voltage developed across this tank-capacitor (due to so-called Q-multiplication) is used for starting and operating the fluorescent lamp.

However, if the load is removed from such a series-resonant LC circuit, which occurs whenever the lamp is removed therefrom or whenever the lamp fails to operate (as is bound to happen toward end of normal lamp life), the voltage developed across the tank-capacitor (and thereby the power drawn by the series-resonant circuit) will become so high as to cause circuit damage—except if some form of over-voltage or over-current protection has been provided.

While Ward does not describe any specific means of over-voltage protection, Zansky does provide for such means in the form of a voltage-clamping arrangement; which arrangement operates to limit the voltage across the tank-capacitor by way of using the inverter's DC supply-voltage as a load for the series-resonant LC circuit whenever the magnitude of the voltage across the tank-capacitor exceeds a certain pre-determined multiple of the magnitude of the DC supply-voltage. Of course, to permit proper lamp starting, it is necessary that this clamping-voltage limit be set higher than the worst-case lamp starting-voltage for the minimum anticipated DC supply-voltage.

In summary, although the best arrangement that can be found among all known prior art voltage-clamping circuits does indeed provide a degree of mitigation against over-voltage and excess power-draw as resulting from having an unloaded series-resonant LC circuit connected directly across the output of an inverter, it provides far from a fully satisfactory solution. Some of its more serious limitations are as follows:

(a) Although the typical prior art voltage-clamping arrangement significantly limits the net power drawn by the overall ballasting system in case of an inoperative lamp, the amount of power that has to be handled by the inverter itself has been limited to a much lesser degree: it still has to handle on a continuous basis all the power associated with having the voltage-clamping arrangement connected across the tank-capacitor—which voltage-clamping arrangement, as far as the inverter and the LC circuit are concerned, is just another load. This implies that the transistors of the inverter have to be able to handle on a continuous basis several times the amount of power that they have to handle in order to provide just for the continuous operation of the regular fluorescent lamp load. (Note: For a fixed input voltage to a series-resonant LC circuit, the power absorbed by a load connected across the tank-capacitor of the LC circuit is substantially proportional to the magnitude of the voltage developed across the tank-capacitor.)

(b) With the DC supply-voltage being used as the voltage-clamping means, the clamping-voltage limit is fully dependent upon the magnitude of this DC supply-voltage. Thus, in cases where the magnitude of the DC supply-voltage may change (as it invariably will in situations where the DC supply-voltage is derived from an ordinary electric utility power line), it is necessary to arrange for the clamping-voltage to be adequately high for proper lamp starting even at the lowest anticipated level of DC supply-voltage; which implies that the clamping-voltage will be that much higher for the maximum anticipated level of DC supply-voltage. Thus, the demands on the inverter in terms of power handling capabilities increase in proportion to the ratio of maximum-to-minimum levels of DC supply-voltage. (Or, conversely, there is a distinct limitation on the minimum level of DC supply-voltage for which the ballast will be able to start the fluorescent lamp).

(c) Even though the inverter in the ballast is able to handle on a continuous basis the excess current that results with an inoperative fluorescent lamp, there is a sufficient amount of wasted power associated with doing so; which implies that—in case such an inoperative fluorescent lamp is left connected with the ballast for an extended period of time, as in indeed apt to occur near end of lamp life—a significant amount of energy is wasted.

Of course, it would be possible to use an ordinary voltage clamping means (such as a Varistor or a Zener diode) for providing the requisite voltage-clamping effect; except that this would result in such a gross amount of excess power dissipation as to be non-feasible both from the viewpoint of size and cost of the voltage-clamping means itself as well as from the viewpoint of excessive energy waste.

Yet, this approach does have the advantage of providing the fluorescent lamp with a starting voltage of substantially constant magnitude regardless of relatively wide variations in the magnitude of the DC supply-voltage.

Thus, while there are several inherent and potentially important advantages associated with resonance-loaded inverter ballasts, the several limitations associated with such ballasts according to prior art are severe enough to prevent their widespread application.

SUMMARY OF THE INVENTION

1. Objects of the Invention

A first object of the present invention is that of providing a basis for designing cost-effective inverter-type ballasts for gas discharge lamps.

A second object is that of providing a basis for designing an inverter circuit that is capable of being loaded safely and effectively by way of a series-resonant circuit.

A third object is that of providing a basis for designing safe, cost-effective and high-efficiency series-resonance-loaded inverter ballasts for fluorescent lamps.

These as well as other objects, features and advantages of the present invention will become apparent from the following description and claims.

2. Brief Description

In its preferred embodiment, subject invention constitutes a series-resonance-loaded fluorescent lamp ballast comprising the following key component parts:

a source of DC voltage, which DC voltage is derived by rectification of the AC voltage from a regular 60 Hz power line;

an inverter connected with said source of DC voltage and operative to provide across an output a relatively high-frequency squarewave voltage, said inverter comprising a disable-means operative on receipt of a disable-signal to disable the inverter and thereby to remove said squarewave voltage from said output while also substantially reducing the power drawn by the inverter from said source of DC voltage;

a series LC circuit connected across said output, said LC circuit being substantially series-resonant at the fundamental frequency of said squarewave voltage;

means for disconnectably connecting a fluorescent lamp across the tank-capacitor of said LC circuit, said fluorescent lamp requiring for proper starting a voltage of magnitude above a certain threshold level;

a Varistor voltage-clamping means and a current-sensor means connected in series across said tank-capacitor, said voltage-clamping means being operative to limit the magnitude of the voltage across said tank-capacitor to a level not substantially higher than said threshold level, said current-sensor being operative to sense the clamping-current flowing through said voltage-clamping means and to provide a clamping-current output whenever clamping-current is flowing through said voltage-clamping means; and integration-means connected in circuit between said clamping-current output and said inverter disable-means, said integration-means being operative to provide said disable-signal to said disable-means whenever clamping-current has been flowing for a period of time longer than that normally required for starting said fluorescent lamp;

whereby, if for some reason the fluorescent lamp fails to present a load to said series LC circuit for more than a brief period, said inverter becomes disabled.

Comparing the operation of the ballast of subject invention with that of resonance-loaded ballasts of prior art, such as that described by Zansky, it is noted that all the indicated limitations have been mitigated:

(a) The amount of power that has to be handled by the inverter on a continuous basis has been limited to just the amount required for operating the fluorescent lamp;

(b) With a Varistor used as the voltage-clamping means, the magnitude of the starting voltage presented to the fluorescent lamp is essentially independent of the magnitude of the DC supply-voltage, which implies that the ballast of subject invention will be able to start and operate the fluorescent lamp over a wide range of DC supply-voltage magnitudes;

(c) Since the inverter is disabled in case the fluorescent lamp fails to operate (or if the lamp is removed), no significant amount of energy is wasted even if an inoperative fluorescent lamp is left connected for an extended period of time.

For the same reason, the power rating of the requisite Varistor may be quite modest.

DESCRIPTION OF THE PREFERRED EMBODIMENT

1. Description of the Drawing

Figure 1:
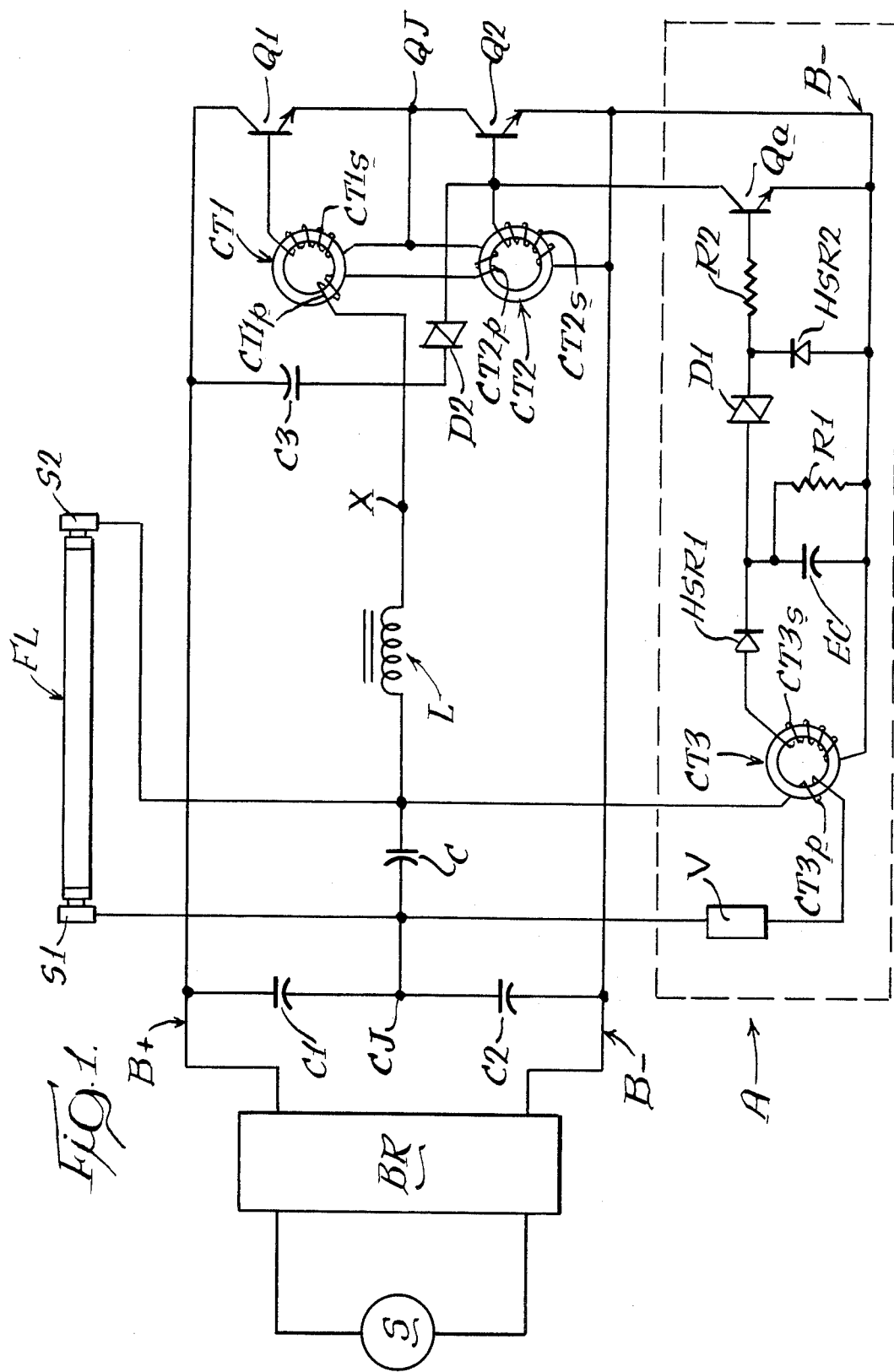
FIG. 1 schematically illustrates a series-resonance-loaded inverter ballast for a fluorescent lamp according to the preferred embodiment of the present invention.

In FIG. 1, a source S of 120 Volt/60 Hz voltage is applied to a full-wave bridge rectifier BR, the unidirectional voltage output of which is applied directly between a B+ bus and a B− bus, with the positive voltage being connected to the B+ bus.

Between the B+ bus and the B− bus are connected a series-combination of two transistors Q1 and Q2 as well as a series-combination of two energy-storing capacitors C1 and C2.

The secondary winding CT1s of positive feedback current transformer CT1 is connected directly between the base and the emitter of transistor Q1; and the secondary winding CT2s of positive feedback current transformer CT2 is connected directly between the base and the emitter of transistor Q2.

The collector of transistor Q1 is connected directly with the B+ bus; the emitter of transistor Q2 is connected directly with the B− bus; and the emitter of transistor Q1 is connected directly with the collector of transistor Q2, thereby forming junction QJ.

One terminal of capacitor C1 is connected directly with the B+ bus, while the other terminal of capacitor C1 is connected with a junction CJ. One terminal of capacitor C2 is connected directly with the B− bus, while the other terminal of capacitor C2 is connected directly with junction CJ.

An inductor L and a capacitor C are connected in series with one another and with the primary windings CT1p and CT2p of current transformers CT1 and CT2.

The series-connected primary windings CT1p and CT2p are connected directly between junction QJ and a point X. Inductor L is connected with one of its terminals to point X and with the other of its terminals to one of the terminals of capacitor C. The other terminal of capacitor C is connected directly with junction CJ.

A fluorescent lamp FL is connected, by way of lamp sockets S1 and S2, in parallel-circuit across capacitor C.

A Varistor V and primary winding CT3p of current transformer CT3 are connected in series across capacitor C.

One terminal of the secondary winding CT3s of transformer CT3 is connected with the B− bus; the other terminal of this secondary winding is connected with the anode of a high speed rectifier HSR1. The cathode of rectifier HSR1 is connected to the positive terminal of an energy-storing capacitor EC. The negative terminal of capacitor EC is connected directly to the B− bus. A bleeding resistor R1 is connected directly across capacitor EC.

A Diac D1 is connected between the cathode of rectifier HSR1 and the cathode of another high speed rectifier HSR2. The anode of rectifier HSR2 is connected to the B− bus.

Between the cathode of rectifier HSR2 and the base of an auxiliary transistor Qa is connected a resistor R2.

The collector of transistor Qa is connected directly to the base of transistor Q2, and the emitter of transistor Qa is connected directly to B− bus.

The combination of varistor V, current transformer CT3, rectifier HSR1, capacitor EC, Resistor R1, Diac D1, rectifier HSR2, resistor R2 and transistor Qa is referred to as sub-assembly A.

A series-combination of a capacitor C3 and a Diac D2 is connected between the B+ bus and the base of transistor Q2.

Values and designations of the various parts of the circuit of FIG. 1 are listed as follows:
Output of Source S: 120 Volt/60 Hz;
Bridge rectifier BR: a bridge of four 1N4004's;
Capacitors C1 & C2: 100 uF/100 Volt Electrolytics;
Transistors Q1 & Q2: Motorola MJE13002's;
Capacitor C: 15 nF/1000 Volt (High-Q);
Fluorescent Lamp FL: Sylvania Octron F032/31K;
Varistor V: 511 Volt/80 Joule;
High-speed Rectifiers HSR1 & HSR2: 1N4154's;
Resistor R1: 68 KOhm/0.25 Watt;
Capacitor EC: 33 uF/35 Volt Electrolytic;
Diacs D1 & D2: 1N5760's;
Resistor R2: 1 kOhm/0.25 Watt;
Transistor Qa: 2N4401;
Capacitor C3: 22 nF/200 Volt;
Transformers CT1 & CT2: Wound on Ferroxcube Toroids 213T050 of 3E2A Ferrite Material with three turns of #26 wire for the primary windings and ten turns of #30 wire for the secondary windings;
Inductor L: 140 turns of three twisted strands of #30 wire on a 3019P-L00-3C8 Ferroxcube Ferrite Pot Core with a 120 mil air gap;
Transformer CT3: Wound on Magnetics Toroid 40503-TC of W Ferrite Material with five turns of #28 wire for the primary winding and 20 turns of #32 wire for the secondary winding;

The frequency of inverter oscillation associated with the component values identified above is approximately 33 kHz.

2. Description of Operation

In FIG. 1, the source S represents an ordinary electric utility power line, the voltage from which is applied directly to the bridge rectifier identified as BR. This bridge rectifier is of conventional construction and provides for the rectified line voltage to be applied to the inverter circuit by way of the B+ bus and the B− bus.

The two energy-storing capacitors C1 and C2 are connected directly across the output of the bridge rectifier BR and serve to filter the rectified line voltage, thereby providing for the voltage between the B+ bus and the B− bus to be substantially constant. Junction CJ between the two capacitors serves to provide a power supply center tap.

The inverter circuit of FIG. 1, which represents a so-called half-bridge inverter, operates in a manner that is analogous with circuits previously described in published literature, as for instance in U.S. Pat. No. 4,184,128 entitled High Efficiency Push-Pull Inverters.

Upon initial application of power to the circuit, inverter oscillation is initiated by way of one or a few trigger pulses applied to the base of transistor Q2 by way of the combination of capacitor C3 and Diac D2. Of course, once the magnitude of the B+ voltage has stabilized, no further trigger pulses will be provided; and, if for some reason the inverter ceases to oscillate, the only way to get it restarted is to remove and then re-apply the power line voltage. (To permit speedy inverter re-starting, a bleeding resistor may be connected between the B+ bus and the B− bus.)

The output of the half-bridge inverter is a substantially squarewave 33 kHz AC voltage provided between point X and junction CJ. Directly across this output is connected a resonant or near-resonant L-C series circuit—with the fluorescent lamp connected in parallel with the tank-capacitor thereof.

The resonant or near-resonant action of the L-C series circuit provides for appropriate lamp starting and operating voltages, as well as for proper lamp current limiting; which is to say that it provides for appropriate lamp ballasting.

The essential feature of the present invention, which involves that of disabling the inverter in case the inverter output power remains at an excessive magnitude for more than a very brief period, is accomplished by way of the sub-assembly referred to as A in FIG. 1.

More particularly, when the inverter is operating, the voltage developed across the tank-capacitor is essentially only limited by the voltage-clamping characteristics of either the fluorescent lamp FL or the Varistor V—i.e., by the one which clamps at the lower voltage. If the lamp is inoperable, or if the lamp is removed from the circuit, or during the brief period before the lamp ignites, the Varistor acts as the principal voltage-clamping means; and the circuit load current then flows through this Varistor. As soon as the lamp gets into operation, however, the voltage across the tank-capacitor (and thereby across the Varistor) falls to a magnitude that is so low that current will no longer flow through the Varistor.

In the arrangement of FIG. 1, the various relevant voltage and current magnitudes are approximately as follows: (i) maximum required lamp starting voltage: 500 Volt RMS for not more than 100 milli-Second; (ii) Varistor RMS and peak clamping voltage, as well as energy-handling capability: 511 Volt RMS, 750 Volt and 80 Joules, respectively; lamp operating voltage and current: 140 Volt RMS and 0.2 Amp RMS, respectively.

In an LC series-resonant circuit, the power provided to a resistive load connected in parallel with the circuit tank-capacitor is approximately proportional to the magnitude of the load resistance. Hence, in FIG. 1, as long as the parameters of the LC circuit have been arranged to provide the fluorescent lamp with its required 0.2 Amp operating current at 140 Volt RMS (which corresponds to 28 Watt), the load power resulting at higher voltages will be roughly proportionately larger. Thus, at the point where the Varistor is clamping (at about 511 Volt RMS), the power provided to the Varistor is on the order of 100 Watt. However, since the fluorescent lamp is supposed to start within 100 milli-Second, the total cumulated energy dissipation in the Varistor is limited by the lamp to about 10 Joule.

That is, under normal conditions, current will flow through the Varistor for but a very brief period of time. Thereafter, the lamp starts and the Varistor in effect gets disconnected.

However, if the lamp is inoperative or not connected, the amount of energy that would be dissipated in the Varistor would rapidly exceed its energy-handling capability. In particular, for the parameters indicated above, the maximum energy capable of being absorbed by the Varistor would be reached in only 0.8 Second.

As long as current is flowing through the Varistor, it also flows through the primary winding CT3p of current-transformer CT3; which roughly implies that a corresponding output current can be obtained from the secondary winding CT3s. By way of rectifier HSR1, the positive component of this output current is used for charging energy-storing capacitor EC; which, after a brief period, accumulates a charge and develops a corresponding voltage. After this capacitor voltage has reached a magnitude high enough to cause the Diac D1 to break down, the accumulated charge on the capacitor is discharged into the base of transistor Qa—the magnitude of the discharge current being limited by the resistance of R2.

With a Diac breakdown voltage of about 30 Volt and a capacitance value of 33 uF for the energy-storing capacitor EC, the amount of charge accumulated at the point of breakdown is about 1 milli-Coulomb. Thus, if the breakdown is to occur in a time period of about 250 milli-Second (which is chosen as being a suitable value), the magnitude of the current supplied to the capacitor would have to be about 10 milli-Amp; which is indeed what is approximately provided in the circuit of FIG. 1.

Now, as the Diac breakes down, the 1 milli-Coulomb charge on capacitor EC discharges into the base of Qa—limited mainly by the 1 kilo-Ohm resistance of R2. With the Qa transistor being thusly switched into a conductive state, albeit for just a brief moment, a very low impedance path is provided between the base and the emitter of transistor Q2. As a result, the inverter feedback path is broken and the inverter stops oscillating.

And, of course, once it has stopped oscillating, the inverter will not restart until trigger pulses are provided by way of Diac D2; and these trigger pulses will not occur until the B+ voltage is made to change significantly. Thus, without having made other provisions, the inverter will not restart until the power line voltage has been removed and then re-applied at a later time—after much of the charge on the filter capacitors has had a chance to leak off.

Of course, to permit a speedier re-initiation of inverter operation, a bleeding resistor may be connected across the two filter capacitors.

It is believed that the present invention and its several attendant advantages and features will be understood from the preceeding description. However, without departing from the spirit of the invention, changes may be made in its form and in the construction and interrelationships of its component parts, the form herein presented merely representing the preferred embodiment.

I claim:
1. An arrangement for powering a gas discharge lamp, said arrangement comprising:
   a source of DC voltage;
   an inverter connected with said source of DC voltage and operable to provide an AC voltage at an output, said inverter having a disable-means operative on receipt of a disable-signal to disable inverter operation and thereby to remove said AC voltage from said output;
   a series-combination of an inductor and a capacitor, said series-combination connected in circuit across said output and being substantially series-resonant at the fundamental frequency of said AC voltage;
   means for connecting said gas discharge lamp in parallel-circuit with said capacitor, said gas discharge lamp requiring for proper functioning an initial starting-voltage of relatively large magnitude and a subsequent operating-voltage of relatively low magnitude, said starting-voltage having to be present across said lamp for a length of time that is not longer than a certain maximum-period;
   voltage-clamping-means connected in parallel-circuit with said capacitor, said voltage-clamping-means being: (i) operative to limit the magnitude of the voltage across said capacitor to a maximum level, said maximum level being not lower than said relatively large magnitude, and (ii) substantially non-conductive at voltages of magnitudes not higher than said relatively low magnitude;
   current-sensing-means connected in circuit with said voltage-clamping-means and operative to sense the clamping-current flowing therethrough and to provide a clamping-signal-output in response to said clamping-current; and
   integration-means connected in circuit between said clamping-signal-output and said disable-means, said integration-means being operative to provide said disable-signal to said disable-means whenever said clamping-signal-output has been present for a length of time that is not shorter than said maximum-period;
   whereby, if said lamp fails to start within said length of time, said inverter is rendered disabled.
2. The arrangement of claim 1 wherein said voltage-clamping means is a varistor.
3. The arrangement of claim 1 wherein said length of time is on the order of two seconds or less.
4. The arrangement of claim 1 wherein the fundamental frequency of said AC voltage is substantially higher than that of the voltages normally present on ordinary electric utility power lines.
5. A power supply operable to provide AC power to a load, said power supply comprising:
   a source of DC voltage;
   an inverter connected with said source of DC voltage and operative to provide an AC voltage at an output, said inverter having a disable-means operable upon receipt of a disable-signal to disable inverter operation and to remove said AC voltage from said output;
   a series-combination of an inductor and a capacitor, said series-combination connected in circuit across said output and being substantially series-resonant at the fundamental frequency of said AC voltage;
   means for connecting said load in circuit with said series-combination;
   voltage-clamping means connected in circuit with said series-combination and operative to prevent the voltage across said capacitor from exceeding a pre-established magnitude;
   current-sensing-means connected in circuit with said voltage-clamping-means and operative to sense flow of clamping-current therethrough and to provide a sensor-signal-output in response to said clamping-current; and
   integration-means coupled in circuit between said sensor-signal-output and said disable-means, said integration-means being operative to provide said disable-signal to said disable-means after a relatively brief period of having clamping-current flowing through said voltage-clamping means;
   whereby, if the magnitude of the voltage present across said capacitor remains high enough to cause flow of clamping-current through said voltage-clamping-means for longer than said relatively brief period, the inverter is rendered disabled.

6. The power supply of claim 5 wherein said relatively brief period is on the order of two seconds or less.

7. The power supply of claim 5 wherein said load comprises a gas discharge lamp.

8. The power supply of claim 5 wherein said voltage-clamping-means is a varistor.

9. The power supply of claim 5 wherein said inverter is of a self-oscillating type that has to be triggered into operation.

10. The power supply of claim 5 wherein the fundamental frequency of said AC voltage is substantially higher than that of the voltages normally present on ordinary electric utility power lines.

11. A power supply operable to provide AC power at an output, said power supply comprising:
  a source of DC voltage;
  inverter-means operative to convert said DC voltage into an AC voltage provided at said output, said inverter-means having a disable-means operable on the receipt of a disable-signal at a disable-signal-input to disable inverter operation and to remove said AC voltage from said output;
  voltage-clamping-means connected in circuit across said output, said voltage-clamping-means being operative to prevent the magnitude of said AC voltage from exceeding a certain maximum level;
  current-sensing-means connected in circuit with said voltage-clamping-means and operative to provide a disable-signal-output in response to flow of clamping-current through said voltage-clamping-means; and
  connect-means providing for connection between said current-sensing-means and said disable-signal-input, thereby to provide said disable-signal-output to said disable-signal-input;
  whereby, if the magnitude of said AC voltage is operative to cause flow of clamping-current, the inverter-means is rendered inoperative, thereby causing removal of said AC voltage from said output.

12. The power supply of claim 11 wherein said current-sensing-means or said connect-means comprises integration-means operative to permit the flow of clamping-current for a relatively brief period of time before providing said disable-signal-output to said disable-signal-input, thereby permitting the magnitude of said AC voltage to remain at or near said maximum level for a brief period of time before causing removal of said AC voltage from said output.

13. The power supply of claim 12 wherein said brief period of time is on the order of two seconds or less.

14. The power supply of claim 11 wherein said inverter-means is operative to limit the magnitude of the current available from said output to a level below that which would cause near-immediate destruction of the inverter-means.

15. The power supply of claim 14 wherein said voltage-clamping-means is a varistor.

* * * * *